United States Patent [19]

Williams et al.

[11] E Re. 28,557

[45] Reissued Sept. 23, 1975

[54] DISC DISPENSING APPARATUS

[76] Inventors: John Gordon Williams, 74 Ravenhill Rd., Fforestfach, Swansea; Peter John Griffiths, 2 Castle St., Skewen, Neath, Glamorgan, both of Wales

[22] Filed: Apr. 17, 1974

[21] Appl. No.: 461,807

Related U.S. Patent Documents

Reissue of:

[64] Patent No.: 3,783,885
Issued: Jan. 8, 1974
Appl. No.: 266,648
Filed: June 27, 1972

[30] Foreign Application Priority Data

June 30, 1971 United Kingdom..... 30732/71
Nov. 27, 1971 United Kingdom..... 55148/71

[52] U.S. Cl. ..... 133/5; 133/8 R
[51] Int. Cl. ..... G07d 1/00
[58] Field of Search..... 133/5, 8 R, 8 B; 221/237, 221/261, 265

[56] References Cited

UNITED STATES PATENTS

| | | | |
|---|---|---|---|
| 902,067 | 10/1908 | Froberg | 133/8 R |
| 1,664,310 | 3/1928 | Murray | 133/8 R X |
| 1,819,235 | 8/1931 | Donnellan | 133/8 B |
| 1,947,456 | 2/1934 | Bock | 133/8 B |
| 3,143,118 | 8/1964 | Haines | 133/8 R |
| 3,242,931 | 3/1966 | Wandrey | 133/8 R |
| 3,612,073 | 10/1971 | Calos | 133/8 R |

*Primary Examiner*—Stanley H. Tollberg
*Attorney, Agent, or Firm*—Burns, Doane, Swecker & Mathis

[57] ABSTRACT

The specification discloses a disc dispensing apparatus in which the discs are placed in a hopper in the base of which is a pair of plates placed one above the other, the upper plate being rotatable and having a number of holes to receive discs which drop into a recess of the lower plate and are ejected from the recess by an ejecting member depending from the upper plate and running in an annular groove in the lower plate.

16 Claims, 5 Drawing Figures

DISC DISPENSING APPARATUS

Matter enclosed in heavy brackets [ ] appears in the original patent but forms no part of this reissue specification; matter printed in italics indicates the additions made by reissue.

BACKGROUND OF THE INVENTION

The present invention relates to a device for dispensing discs, such as coins or tokens.

The invention is of particular use when there is need to dispense discs one at a time and in specific quantities.

Thus, for example, in banks or amusement arcades machines are used which dispense coins in measured quantities. Also, in certain amusement machines sometimes known as "fruit machines," there is need to dispense discs, in particular coins or tokens, in measured quantities from a hopper into which fall in random fashion discs inserted into the machine by the user.

An object of the invention is to provide a novel and simple apparatus for dispensing discs, and a preferred form of the invention may be particularly suitable for dispensing reliably and in measured quantities discs arranged in random fashion within a hopper.

SUMMARY AND DESCRIPTION OF INVENTION

According to the present invention, there is provided apparatus for dispensing discs, the apparatus being characterised in that it comprises upper and lower relatively rotatable plates, a disc receiving hole being positioned in the upper plate to receive a disc to be dispensed, the lower plate having a disc supporting surface and a disc received recess disposed below such disc supporting surface, said recess communicating with the exterior of the plates, the upper plate having disc ejecting means to engage a disc in said recess and to drive such disc from the recess, the arrangement being such that the hole in the upper plate can receive a disc which is then supported from below by the disc supporting surface of the lower plate, the disc riding on said disc supporting surface during continued relative rotation of the plates until the disc is in alignment with and drops into the disc receiving recess in the lower plate, from which recess the disc is ejected by the disc ejecting means during further relative rotation of the plates.

In a preferred form of the invention, the two plates are disposed in the lower portion of a hopper which serves to receive discs disposed in random positions, and in such arrangement it is preferable to arrange to lower plate to be stationary and to arrange the upper plate to rotate so that the upper rotating plate disturbs and re-positions the discs arranged above it as it rotates.

When it is desired that the discs should be dispensed in controlled quantities, a counting mechanism may be arranged to count discs dispensed and to prevent relative rotation of the two plates when the required number of discs has been dispensed. For example, the counting mechanism may interrupt the supply of electricity to an electric drive motor arranged to drive the upper plate, braking means being provided to prevent the motor overruning after the supply of electricity has been interrupted.

In order that the present invention may be more readily understood, several embodiments of a disc dispensing apparatus according to the invention will now be described by way of example, and with reference to the accompanying drawings.

BRIEF DESCRIPTION OF THE DRAWINGS

FIG. 1 shows a combined hopper and disc dispensing apparatus, such as might be used in an amusement machine of the type which receives and pays out discs, such as coins, such machines being known as "fruit machines."

Figure 1:
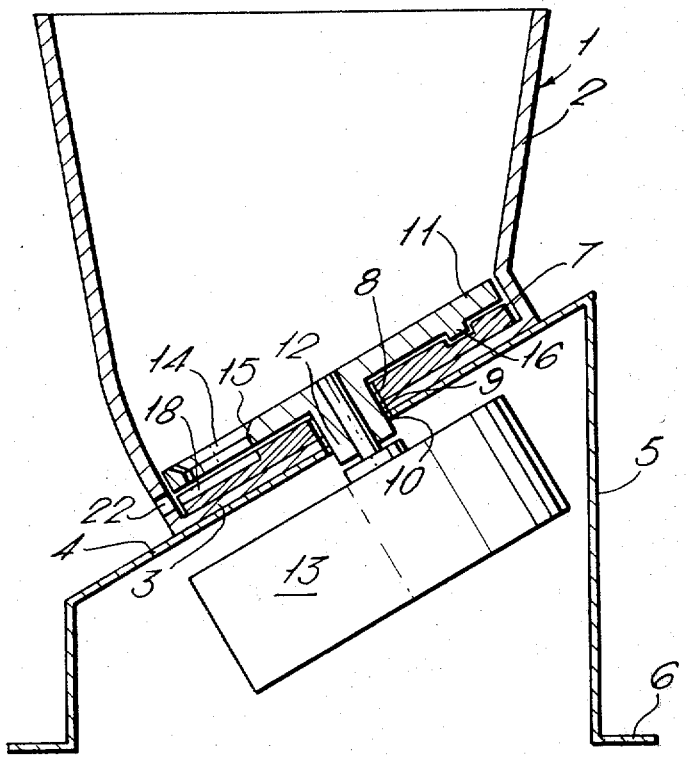
FIG. 1 is a partially sectioned front elevational view of a combined hopper and disc dispenser according to the invention, and including upper and lower relatively rotatable plates.

In such machines, coins inserted by a user as he plays the machine are fed into a hopper, and must be dispensed from said hopper in various controlled quantities when the machine records a winning combination.

The apparatus of FIG[1]is designed to dispense the [ disc ] *discs* one at a time from the hopper.

The hopper 1 has a continuous curved side wall 2, the diameter of the hopper tapering towards the base thereof whereby such hopper is generally frustoconical. However, the side wall [1] *2* extends lower on one side than on the other, so that the planar base wall 3 of the hopper slopes downwardly from right to left at an angle of approximately 30° to the horizontal as viewed in FIG. 1.

The hopper 1 is mounted with said base wall 3 secured to a correspondingly sloped upper wall 4 of a supporting stand 5 which is arranged to stand on a horizontal supporting surface (for example a platform within an amusement machine) by way of a peripheral flange 6 of the stand.

Fixedly secured within the hopper to the upper surface of the base wall 3 by any suitable means not shown in a lower plate 7 having a central aperture 8 in registry with a central aperture 9 in the hopper base wall 3 and a similar aperture 10 in the wall 4 of the stand 5.

An upper plate 11 of the apparatus is mounted directly above the lower plate 7, both plates sloping at the same angle as the base wall 3 of the hopper, that is an angle of approximately 30° to the horizontal. The said upper plate 11 has a central downwardly extending boss 12 extending through the aligned apertures 8, 9 and 10 in the lower plate 7, the base wall 3 of the hopper, and the wall 4 of the stand respectively.

The upper plate is arranged to be rotated anticlockwise (as viewed from above) by means of an electric motor 13 shown diagrammatically in FIG. 1, the motor having a drive shaft secured within a central aperture of the boss 12.

Figure 2:
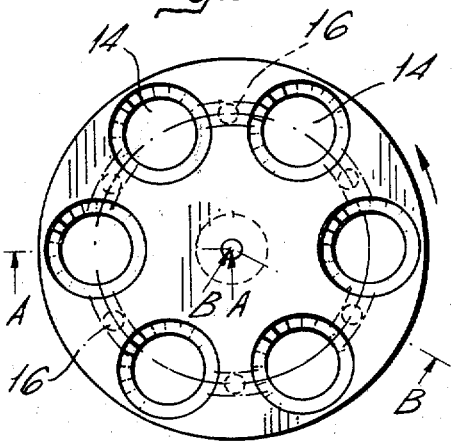
FIG. 2 is a top plan view of the said upper plate.

As may be best seen from FIG. 2, the upper plate 11 has six disc receiving holes 14 equally spaced apart around the plate and located near the outer periphery thereof. The upper portion of each hole 14 is bevelled as shown at 15.

The upper plate has six projections 16 depending from the underside thereof, each projection being mounted equidistantly between a pair of adjacent holes 14, the projections serving as disc ejecting members as will be explained hereinafter.

During rotation of the upper plate 14 as a result of energisation of the electric motor 13, the projections 16 run in a generally annular groove 17 in the lower plate, the groove 17 being dimensioned to receive the projections with a clearance on either side of the projections.

As may be seen by comparing the views of the upper plate 11 in FIGS. 1 and 2, the view in FIG. 1 of the portion of upper plate disposed on the left hand side of the rotational axis of the plate is taken on the line A—A of FIG. 2, whereas the portion of the upper plate shown on the right hand side of the rotational axis is taken on the line B—B of FIG. 2.

The lower plate has a disc receiving recess 18 formed in the upper face thereof, the recess extending from the periphery of the plate inwardly beyond the groove 17, the depth of the recess being sufficient to receive one disc only of the discs which the apparatus is intended to dispense. As may be seen from FIG. 1, the recess 18 is disposed in the lowermost portion of the hopper.

Figure 3:
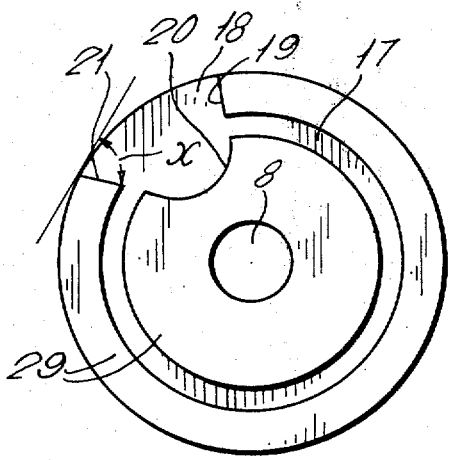
FIG. 3 is a top plan view of the said lower plate.

The lower plate is best illustrated in FIG. 3. As shown, the wall which in part bounds the recess 18 comprises a generally straight radial portion 19, an adjoining curved portion 20, and a generally straight portion 21. The straight portion 21 is so disposed that with respect to a tangent to the plate at the position where the wall 21 reaches the periphery of the plate, such wall 21 forms an angle (measured nearest the wall 19) of less than 90°, for example of 75°, the angle being shown at x in FIG. 3.

Referring again to FIG. 1, there is shown an aperture 22 in the side wall of the hopper, the aperture 22 being positioned to receive a disc ejected from the disc receiving recess 18 in the lower plate.

The apparatus is also provided with disc counting means which are not illustrated and are well known in the art, such means being arranged to interrupt the supply of electric current to the motor 13 when a requisite number of discs have been dispensed. Braking means (not shown) are arranged to prevent the motor 13 from overrunning and dispensing an excessive number of discs.

Operation of the apparatus of FIGS. 1 to 3 will now be described. The hopper 1 will contain a number of discs disposed in random fashion therein, the discs being of a diameter slightly less than the diameter of the holes 14 (FIG. 2) and of a thickness slightly less than the depth of the recess 18 (see FIG. 1). The discs will have a tendency to move under gravitation to the lowermost portion of the hopper in which the [ discs ] *disc* receiving recess 18 is located.

When it is desired to dispense discs, the motor 13 is energised to drive the upper disc to rotate anticlockwise as viewed from above, that is in the direction of the arrow in FIG. 2.

As the upper plate rotates, the discs will be disturbed and re-positioned, and will tend to fall into the holes 14 in the upper plate 11, the discs being guided into the holes partly by way of the bevelled wall portion 15 surrounding the upper portion of each hole 14. A disc which has fallen into a hole 14 in the upper plate will be carried round with such plate during rotation thereof, and the disc will ride on a disc supporting portion 29 of the lower plate, such disc supporting portion 29 being disposed on either side of the groove 17.

When such hole 14 moves above the disc receiving recess 18 in the lower plate, the disc will drop into the recess 18, and the upper plate will continue to rotate passing over the disc.

Of course, the speed of rotation of the upper disc must not be excessively fast in order to ensure that the coin has sufficient time to drop into the recess 18 as the hole 14 containing the disc passes over the recess 18.

It will be appreciated that as the disc approaches the recess 18, the leading edge of the disc will first pass the wall portion 19 which may be bevelled to assist the fall of the coin into the recess 18 and when the disc is positioned in the recess 18, the disc will lie in abutment or close to the suitably rounded wall 20. The disc will remain in position within the disc receiving recess 18 in the lower plate until engaged by a disc ejecting projection 16 which is positioned immediately behind the hole 14 from which the disc has previously dropped. The disc ejecting member enters the recess via the groove in the region of wall 19, and then engages one edge of the disc. The projection tends to force the disc to move anti-clockwise, and the wall portion 21 tends to act as a cam to force the disc outwardly. During further rotation of the upper plate, the disc is thus forced by the projection 16 out of the recess 18 and through the slot 22 in the hopper side wall.

It will be appreciated that if a disc ejecting projection 16 were to approach a disc in a direct line with a radial axis of the disc or outwardly thereof towards the periphery of the lower plate, and if the angle x were to be 90° or greater, the disc would be urged towards the centre of the plate rather than outwardly and would jam against the wall portion 20 or the wall portion 21. The angle x and the position at which a projection engages a disc must therefore be chosen appropriately to ensure the minimum risk of jamming occuring.

It will be appreciated that any suitable known counting device may be arranged to count the discs as they emerge from the aperture 22 and that such counting means may interrupt the supply of electric current to the motor 13 to prevent the dispensing of further discs immediately the required number of discs has been paid out.

The upper plate of the apparatus illustrated in FIGS. 1 to 3 is provided with six coin ejecting projections 16 and with six coin receiving holes 14. However, it will be appreciated that the apparatus would function with only one hole 14 and one disc ejecting projection 16, and the number of holes 14 and projections 16 will be chosen according to the requirements of the apparatus. It will be appreciated that the greater the number of holes 14 and projections 16, the greater is the risk of an additional disc being dispensed due to a delay in the stopping of rotation of the upper plate. However, a disc provided with a large number of apertures 14 and projections 16 may be arranged to rotate at a relatively low speed in order to lessen the risk of the upper plate running on.

Although the plates 7 and 11 are sloped at an angle of 30° in the apparatus shown in FIG. 1 in order to assist the coins in their movement towards a position above the disc receiving recess 18, the plates and the corresponding base wall of the hopper could instead be arranged to be horizontal.

The above described apparatus are arranged to dispense discs disposed in random positions within a hopper. However, in another form of apparatus a vertically extending tube could be provided which terminates immediately above the upper plate and arranged to be in registry with the disc receiving recess in the lower plate. A disadvantage of such apparatus is that it would be necessary to replenish the supply of discs within the tube according to requirements, and this will require manual assistance. Thus, such an embodiment might be more suitable for use in a bank where an employee is on hand to attend the machine rather than for use in an amusement machine. However, since the discs are fed by the tube in controlled fashion and in correct horizontal alignment in the latter mentioned apparatus, there is little risk of jamming being caused by a coin being trapped between the upper and lower plates. It will be appreciated that there is a risk of such jamming occurring in the embodiment described with reference to FIGS. 1 to 3.

Figure 4:
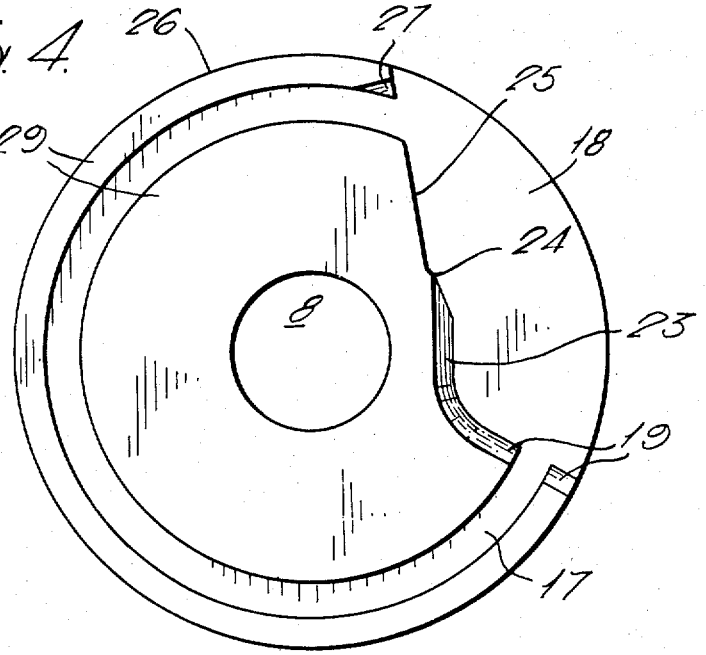
FIG. 4 is a top plan view of a modified form of lower plate suitable for use in the apparatus of FIG. 1.
Figure 5:
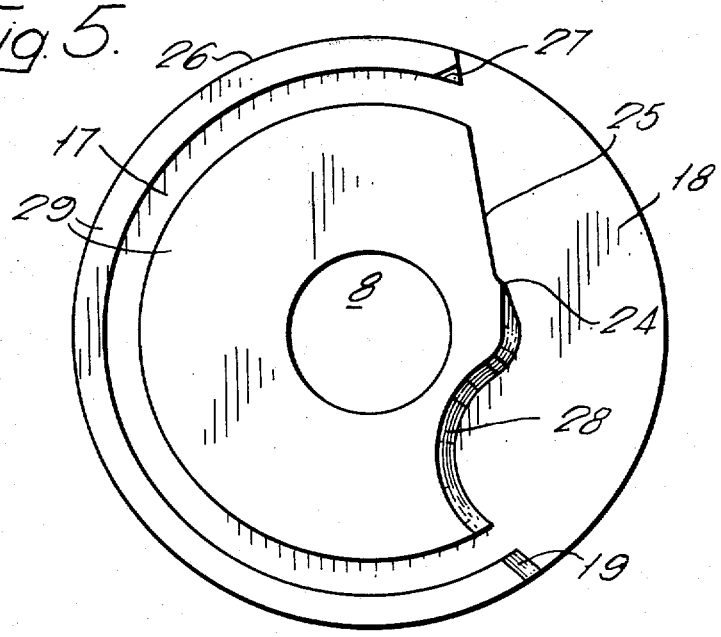
FIG. 5 is a top plan view of a further design of lower plate which is also suitable for use in the apparatus of FIG. 1.

In order to lessen the risk of a coin jamming the mechanism shown in FIG. 1, a modified lower plate can be used, and FIGS. 4 and 5 illustrates possible alternative arrangements of a lower plate for use in the apparatus of FIG. 1. Referring now to FIG. 4, there is shown an arrangement in which the coin receiving recess 18 is of larger dimensions than the corresponding recess shown in FIG. 3. The "upstream" portion of the recess 18 at which a disc enters the recess is again provided with a generally radial wall portion 19 which is bisected by the groove 17, and it will be observed that the wall portion 19 slopes downwardly and forwardly in the direction of movement of a disc entering the aperture whereby to assist the disc in sliding smoothly into the aperture rather than dropping suddenly therein. The wall portion 19 merges with a straight wall portion 23 which extends parallel to a tangent to the circle of revolution of a disc ejecting member and drawn at the point where such circle is intersected by a line passing through the centre of the circle and bisecting the wall 23. This wall 23 slopes downwardly towards the periphery of the plate. The sloping wall section merges at 24 with a vertically sided wall section 25 which is intersected by the groove 17 and is positioned at the "downstream" side of the recess, that is the side of the recess from which the disc is ejected. The vertical wall section 25 extends at an angle of approximately 165° relative to the wall portion 23, said angle being measured on the side of the walls which is nearest the centre of the plate.

It will be understood that the groove 17 is of the same depth as the recess 18, and that the groove and recess together provide the plate with an arcuate peripheral wall 26 which subtends an angle of approximately 260° at the centre of the plate. This wall 26 is chamfered at 27 upwardly in the direction in which a disc travels when being ejected from the recess, the chamfer extending from the floor of the groove 17 and recess 18 of the top of the wall 26.

The angles of the various wall portions the angles of sloping and chamfering, and the positions of the various portions of the plate are chosen to guide a disc in such a way as to tend to prevent a disc from jamming the apparatus.

Although, as stated above, the purpose of the sloping wall face 19 is to guide a disc smoothly into the recess 18, a disc may not always be delivered to the recess 18 by a hole 14 in a correct position in which the disc may drop correctly through the hole 14 and into the recess 18.

It is possible for a disc to adopt a position in which it is tilted with that edge of the disc nearest the centre of the plate lying in the recess against the wall portion 23, and the opposite edge of the disc positioned still within a hole 14 in the upper plate. Were the face of wall portion 23 to be vertical, this would lead to jamming of the disc between the wall 23 and the wall defining the hole 14 in the upper plate. However, because of the slope of wall 23 a disc tilted in the manner described above would be forced to ride up the face of the wall part 23 so that the disc would be forced completely [our] *out* of the recess 18 and back into the hole 14 in the upper plate so that the disc would be carried round with the upper plate and thus prevent jamming.

A disc could also adopt a position in which it was tilted forwardly downwardly with its leading edge in contact with the edge of wall 26 at the point where the groove 17 joins the recess 18, and with the trailing edge of the coin still positioned within the hole 14. If the wall 26 were not provided with the bevel or chamfer 27, the disc would be trapped between the wall 26 and the wall surrounding an aperture 14, and the mechanism would thus jam. However, because of the chamfer 27 provided, the leading edge of the disc tilted as described above would be cammed upwardly back into the hole 14 and would not cause jamming.

It will be appreciated that any disc which for any reason is forced back into a hole 14 or does not drop into the recess 18 as the hole passes over the recess may well drop correctly into the recess when the hole next passes over said recess. As stated above, the discs will be constantly re-arranged and moved as the upper plate rotates.

Referring now to FIG. 5, there is shown a plate very similar to the plate shown in FIG. 4. However, in FIG. 5 a wall portion 28 corresponding to the wall portion 23 in FIG. 4 is curved and approaches nearer to the center of the plate whereby to provide increased clearance for a disc to fall into the recess 18. The walls 23 and 28 in each case serve to act as a cam in cooperation with the disc ejecting member 16 to force the disc from within the recess. In each case the wall portion 25 serves the same purpose, but is disposed at a different angle.

In each of the embodiments described above, the disc receiving recess 18 *is* of such a depth as to receive one disc only of the discs to be dispensed. However, it will be appreciated that in an arrangement such as is described above in which the discs are fed directly onto the upper rotating plate by means of a tube it is possible for the depth of the recess to be in multiples of the thickness of the discs whereby to allow the discs to be dispensed at an increased speed. However, such arrangement would not be possible in the embodiment of FIGS. 1 to 3.

We claim:

1. Apparatus for dispensing discs, for example coins, the apparatus comprising upper and lower relatively rotatable plates the upper plate having a disc receiving hole positioned to receive a disc to be dispensed, the lower plate having a disc supporting surface and a disc receiving recess disposed below such disc supporting surface, said recess communicating with the exterior of the plates, the upper plate having disc ejecting means to engage a disc in said recess and to drive such disc from the recess, the arrangement being such that the hole in the upper plate can receive a disc which is supported from below by said disc supporting surface of the lower plate, the disc riding on the said disc supporting surface during continued relative rotation of the plates until the disc is in alignment with, and drops into the disc receiving recess from which it is ejected by the disc ejecting means during further relative rotation of the plates.

2. Apparatus as claimed in claim 1, in which the lower plate is arranged to remain stationary and the upper plate is rotatable.

3. Apparatus as claimed in claim 2, in which both plates are arranged at the base of a hopper.

4. Apparatus as claimed in claim 3 in which the plates slope at an angle [of] *to* the horizontal and in which the disc receiving recess is arranged to be lowermost.

5. Apparatus as claimed in claim 3, in which the plates are disposed horizontally.

6. Apparatus as claimed in claim 1 in which a vertical tube is arranged directly above the upper plate and in direct alignment with the disc receiving recess.

7. Apparatus as claimed in claim 2 in which the disc ejecting means comprises a member extending downwardly from the upper rotatable plate and extending into a groove formed in the disc supporting surface of the lower plate, such groove extending in a circular arc around the lower plate from one end region of the recess to an opposite end region.

8. Apparatus as claimed in claim 7, in which the lower plate has a sloping wall portion arranged radially at that portion of the recess where a disc first enters the recess, such wall portion sloping downwardly in the direction of movement of a disc.

9. Apparatus as claimed in claim 8, in which a disc guide wall portion is provided adjacent the radial wall portion and serves to guide a disc towards the periphery of the plate as the disc is ejected from the recess by the disc ejecting means.

10. Apparatus as claimed in claim 9, in which the disc guide wall portion slopes downwardly towards the periphery of the disc and merges with the floor of disc receiving recess, such sloping wall serving to prevent jamming of a disc between such wall and the peripheral wall of a disc receiving hole in the upper plate.

11. Apparatus as claimed in claim 10, in which the disc guide wall is curved.

12. Apparatus as claimed in claim 10, in which a vertical wall portion is provided adjacent said sloping wall portion, said vertical wall portion extending as far as the groove.

13. Apparatus as claimed in claim 7, in which a peripheral wall of the lower plate which wall is defined by the groove and disc receiving recess, has a bevelled face sloping upwardly in the direction of movement of the disc being ejected, such bevelled face extending upwardly from the floor of the recess and groove to the top face of the peripheral wall and serving to prevent jamming of a disc between the peripheral wall and a wall defining a hole in the upper plate.

14. Apparatus as claimed in claim 1, in which a plurality of disc receiving holes and disc ejecting members are provided on the upper plate.

15. Apparatus as claimed in claim 1, in which counting means are provided to count discs ejected and to interrupt rotation of the plates when a desired number of discs have been ejected.

16. An amusement machine including apparatus for dispensing discs, the apparatus comprising a rotatable upper plate and a non rotatable lower plate, the upper plate having a disc receiving hole positioned to receive a disc to be dispensed, the lower plate having a disc supporting surface and a disc receiving recess disposed below such disc supporting surface, said recess communicating with the exterior of the plates, the upper plate having disc ejecting means to engage a disc in said recess and to drive said disc from the recess, the arrangement being such that the hole in the upper plate can receive a disc which is supported from below by said disc supporting surface of the lower plate, the disc riding on said disc supporting surface during continued rotation of the upper plate until the disc is in alignment with, and drops into the disc receiving recess from which it is ejected by the disc ejecting means during further rotation of the upper plate, the upper and lower plates being disposed at the base of a hopper arranged to contain discs to be dispensed, the disc ejecting means comprising a member extending downwardly from the upper rotatable plate and extending into a groove formed in the disc supporting surface of the lower plate, such groove extending in a circular arc around the lower plate from one end region of the recess to an opposite end region, counting means being provided to count discs ejected and to interrupt relative rotation of the plates when a desired number of discs have been ejected.

* * * * *